(12) United States Patent
Park et al.

(10) Patent No.: US 10,900,783 B2
(45) Date of Patent: Jan. 26, 2021

(54) MEMS METAL-QUARTZ GYROSCOPE

(71) Applicant: Lawrence Livermore National Security, LLC, Livermore, CA (US)

(72) Inventors: Sangtae Park, San Ramon, CA (US); Satinderpall S. Pannu, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 188 days.

(21) Appl. No.: 16/008,793

(22) Filed: Jun. 14, 2018

(65) Prior Publication Data
US 2019/0383611 A1  Dec. 19, 2019

(51) Int. Cl.
*G01C 19/5621* (2012.01)

(52) U.S. Cl.
CPC ............... *G01C 19/5621* (2013.01)

(58) Field of Classification Search
CPC ............ G01C 19/5621; G01C 19/5642; G01C 19/5656; G01C 19/5733; G01C 19/5755; G01C 19/02
USPC .............. 73/504.16, 504.03, 504.04, 504.12, 73/504.14, 514.15
See application file for complete search history.

(56) References Cited

U.S. PATENT DOCUMENTS

| | | | |
|---|---|---|---|
| 5,349,855 A | 9/1994 | Bernstein et al. | |
| 5,767,405 A | 6/1998 | Bernstein et al. | |
| 6,044,707 A * | 4/2000 | Kato | G01C 19/5719 73/504.02 |
| 7,134,340 B2 * | 11/2006 | Samuels | B81B 3/0072 73/514.32 |
| 2010/0043551 A1 * | 2/2010 | Geen | G01C 19/5719 73/514.15 |

OTHER PUBLICATIONS

Wu, Xuezhong et al., "A Z-Axis Quartz Tuning Fork Micromachined Gyroscope Based on Shear Stress Detection", IEEE Sensors Journal., vol. 12, No. 5, May 2012, pp. 1246-1252.
Xie, Liqiang et al., "A Novel Micromachined Quartz Gyroscope Based on Shear Stress Detection", Proceedings of IEEE Sensors, Christchurch, New Zealand, 2009, pp. 445-448.
Wang, Haoxu et al., "Sidewall Arris Flatting Process in Quartz Gyroscope Fabrication". In Nano/Micro Engineered and Molecular Systems (NEMS), 2010 5th IEEE International Conference on IEEE, Ziamen, China, 5 pp.
(Continued)

*Primary Examiner* — Robert R Raevis
(74) *Attorney, Agent, or Firm* — Harness, Dickey & Pierce, P.L.C.

(57) ABSTRACT

The present disclosure relates to a gyroscope that makes use of a shuttle having a first plurality of fingers, a stator having a second plurality of fingers, at least one fixed support structure, and a plurality of flexors for supporting the shuttle for vibratory motion relative to the stator. The fingers of the shuttle are able to move in a vibratory motion adjacent the fingers of the stator without contacting the fingers of the stator. Portions of the fingers of at least one of the shuttle and the stator also make use of a grounded metal material layer to reduce parasitic capacitive coupling between the fingers of the shuttle and the fingers of the stator.

18 Claims, 6 Drawing Sheets

(56) References Cited

OTHER PUBLICATIONS

Nasiri, Steven, "A Critical Review of MEMS Gyroscopes Technology And Commercialization Status", Available online: https://invensense.com/mems/gyro/documents/whitepapers/MEMSGyroComp.pdf (accessed on May 25, 2012), 2009, 9 pp.

Rozelle, David M., "The Hemispherical Resonator Gyro: From Wineglass to the Planets", Northrop Grumman, Proceedings 19th AAS/AIAA Space Flight Mechanics Meeting, 2009, 28 pp.

Production Specification for AC-63/AC-62/AC-61 Force Balance Accelerometer manufactured by GeoSIG Ltd., May 18 2011, 2 pp.

\* cited by examiner

MEMS METAL-QUARTZ GYROSCOPE

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to the manufacture of vibratory gyroscopes, and more particularly to a MEMS quartz vibratory gyroscope and a method for manufacturing same.

BACKGROUND

This section provides background information related to the present disclosure which is not necessarily prior art.

The use of vibratory gyroscopes has been widespread in both government and commercial applications. Some of these applications have been in different categories of devices requiring differing performance levels. For example, vibratory gyroscopes have been used in rate, tactical, and inertial grade gyroscopic devices, with the latter having the most stringent requirements. Some of the examples have been in automotive, consumer electronics, industrial, and aerospace/military applications.

With the maturing of silicon micromachining technologies, silicon vibratory gyroscopes have been demonstrated and produced for many different applications since the 1990s. However, Quartz has always been the choice material for it high quality factor (Q) even at atmospheric pressure and its stability with respect to temperature variations and other environmental changes. Nevertheless, up until the present time, the manufacture of a vibratory gyroscope from Quartz has not been possible in large part due to manufacturing limitations.

SUMMARY

This section provides a general summary of the disclosure, and is not a comprehensive disclosure of its full scope or all of its features.

In one aspect the present disclosure relates to a gyroscope, which may have a shuttle having a first plurality of fingers, a stator having a second plurality of fingers, and at least one fixed support structure. The gyroscope may further include a plurality of flexors for supporting the shuttle for vibratory motion relative to the stator such that the fingers of the shuttle are able to move in a vibrating motion adjacent the fingers of the stator without contacting the fingers of the stator. Portions of the fingers of at least one of the shuttle and the stator may include a grounded metal material layer to reduce parasitic capacitive coupling between the fingers of the shuttle and the fingers of the stator.

In another aspect the present disclosure relates to a gyroscope which may comprise a plurality of shuttles each having a first plurality of fingers, a plurality of stators, each having a second plurality of fingers, and at least one fixed support structure. A plurality of flexors may be included for supporting each one of the shuttles for vibrating motion relative to the stators, and such that the fingers of each one of the shuttles are able to move in an oscillating motion adjacent the fingers of a corresponding pair of the stators. Portions of the first plurality of fingers of each of the shuttles and the portions of each one of the second plurality of fingers of the stators may include a grounded metal material layer to reduce parasitic capacitive coupling between the first plurality of fingers of the shuttle and the second plurality of fingers of the stator.

In still another aspect the present disclosure may relate to a method for forming a gyroscope. The method may comprise forming a substrate having an insulating layer with a first insulating material, covered on opposing surfaces thereof by layers of a second insulating material. The method may further include etching a sensor pattern in one of the opposing layers of the second insulating material to form a plurality of fingers, coating portions of the fingers with a metal material; and grounding the metal material. The method may further involve removing portions of the second insulating material to form a shuttle, fully separate stator, a support substrate, and a plurality of flexors, the shuttle and the stator each including a plurality of fingers. The flexors enable vibrating motion of the shuttle relative to the stator. The method may further involve forming a piezoelectric material layer on at least portions the flexors for sensing a Coriolis force acting on the shuttle during motion of the shuttle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings.

Corresponding reference numerals indicate corresponding parts throughout the several views of the drawings.

DETAILED DESCRIPTION

Example embodiments will now be described more fully with reference to the accompanying drawings.

Although quartz has been the choice material for vibratory gyroscopes, it has not been used thus far in batch fabricated micro-electromechanical systems ("MEMS") gyroscopes. With the maturing of microfabrication technologies, it is possible now to batch fabricate quartz based vibratory gyroscopes in a cost-effective manner. As will be explained in greater detail below, the present method utilizes microfabrication technologies, one being glass Deep Reactive Ion Etching (DRIE) technology, in manufacturing a vibratory gyroscope from quartz.

Figure 1:
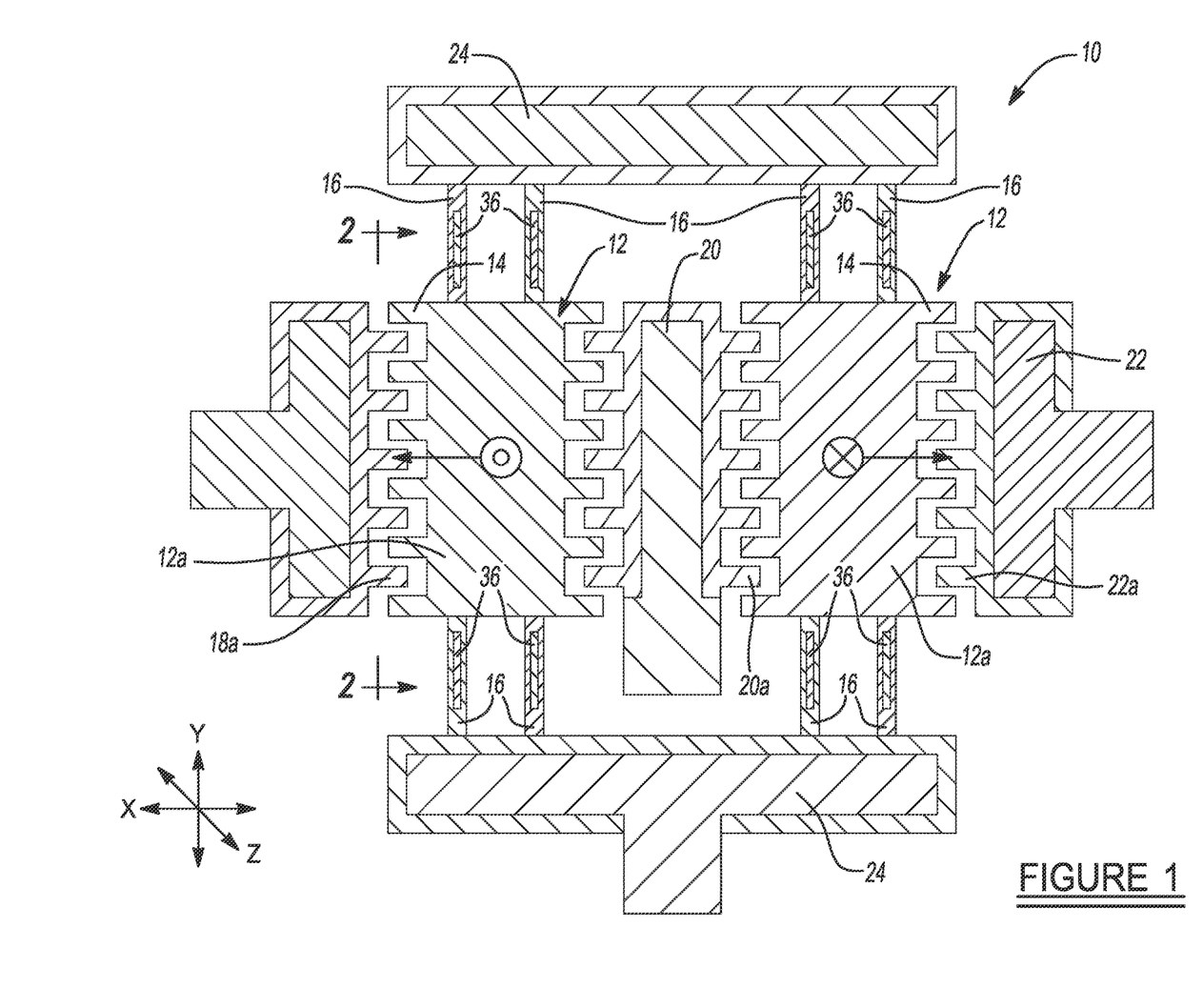
FIG. 1 shows a cross sectional plan view of a gyroscope made in accordance with one embodiment of the present disclosure.

Referring to FIG. 1, a high level cross sectional side view of a MEMS, quartz-based gyroscope 10 is shown in accordance with one embodiment of the present disclosure. The gyroscope 10 in this example includes a pair of shuttles 12 that each incorporate a body portion 12a from which extend a plurality of fingers 14. Each shuttle 12 further includes and is supported in this example by four flexors 16, and is thus free to vibrate along the Z axis (i.e., in FIG. 1, into and out from the page). The shuttles 12 are positioned between three fixedly mounted stators 18, 20 and 22 and are stationary, while the shuttles are free to move in an oscillating fashion. The stators 18, 20 and 22 each have a plurality of aligned fingers 18a, 20a and 22a with spacings between them to allow a predetermined clearance with the fingers 14 of each shuttle 12 during vibratory motion of the shuttles 12. The flexors 16 are coupled to fixed support structures 24 so that the shuttles 12 can move freely in a vibratory manner relative to the stators 18, 20 and 22.

Figure 2:
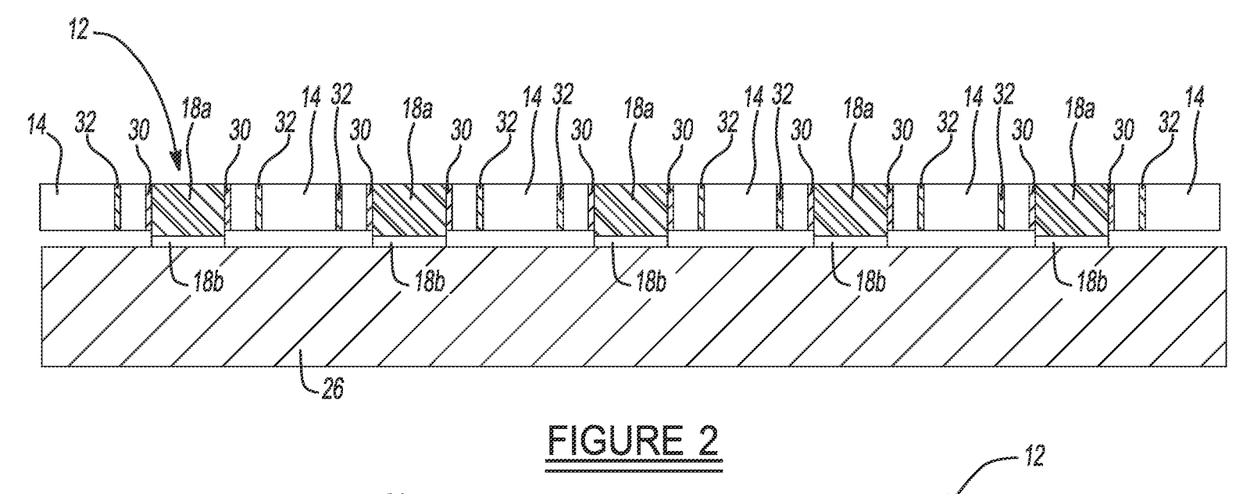
FIG. 2 shows a high level cross sectional view of a portion of the gyroscope of FIG. 1 taken in accordance with section line 2-2.

FIG. 2 also illustrates in simplified fashion that the fingers 18a and a substrate 26 may be bonded by gold thermal compression bond or any other suitable wafer bonding techniques. Layer 18b may be a metallic layer that enables a conductive path to be established with a metal layer 30 on a portion of each of the fingers 18a. The shuttles 12 may be driven by comb-drive electrostatic actuators (not shown) in tuning fork mode. The Coriolis force on the two shuttles 12 (i.e., which form masses) will be sensed by the piezoelectric effect of a quartz material 36 (which may be z-cut) on the surfaces of each of the four flexors 16 of each shuttle 12 via the piezoelectric (e.g., quartz) material, or by the four flexors 16 of each shuttle if they were fabricated out of piezoelectric material. In addition, the position of the shuttle 12 can be measured by capacitive sensing between the comb fingers 18a and 14. This capacitive sensing would not be affected by parasitic capacitance formed between the comb fingers 18a and 14, and the substrate 26 and shuttle 12, or other nearby structures since the substrate 26 (as well as the shuttle body portion 12a) are electrically non-conductive.

The metal layers 30 and 32 provide an important benefit of ensuring that the sensed capacitance change due to shuttle 12 movement is only due to motion of the flexors 16 (i.e., the "spring" regions) and the comb fingers 14 and not due to parasitic capacitance with the substrate 26 and other nearby structures. The fact that all substrate materials are insulative, provides that there will be no parasitic capacitive coupling between the movable portions (i.e., shuttle fingers 14 and the shuttle body portion 12a) and the fixed portions (i.e., fingers 18a, 20a and 22a of stators 18, 20 and 22) of the gyroscope 10. Alternatively, the outputs from the quartz (i.e., piezoelectric) material layers 36 (or the substrate 34, if the substrate is itself formed from a piezoelectric material) may be sensed directly, because as each of these material layers 36 flex (or as the piezoelectric substrate 34 flexes), the material layer 36 (or the piezoelectric substrate 34) will produce a voltage across it, which voltage can be detected directly with suitable voltage sensing devices. It will be appreciated that layer 36 may be adhered to substrate 34 by using an adhesion layer such as titanium. Thus, it will be appreciated that there is metal on the comb fingers 18a and the fingers 14 (i.e., sides thereof), but not on the shuttle body portion 12a or the flexors 16. Without metal being in these just-named structures, the parasitic capacitances are significantly reduced or eliminated, and measurement precision is significantly increased.

Figure 3:
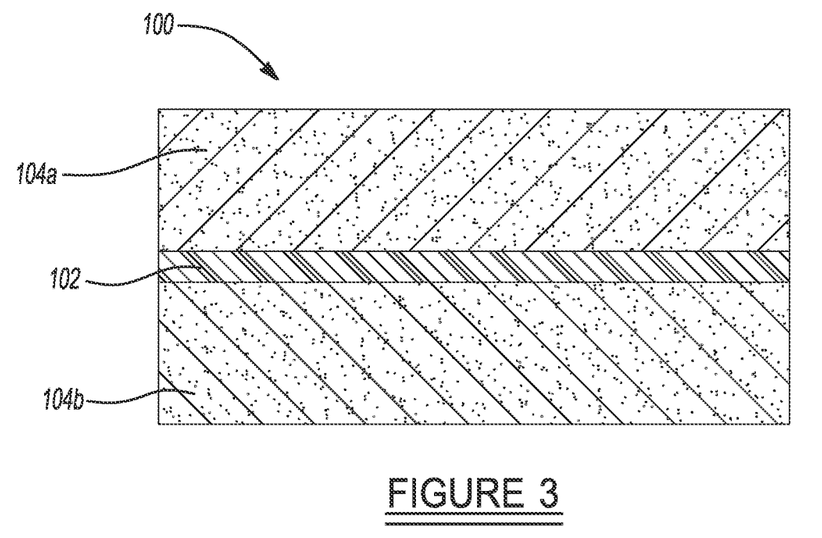
FIG. 3 shows a first manufacturing operation in manufacturing a vibratory gyroscope from Quartz, wherein the operation beings with forming a quartz layer on an insulator layer to create a substrate.
Figure 4:
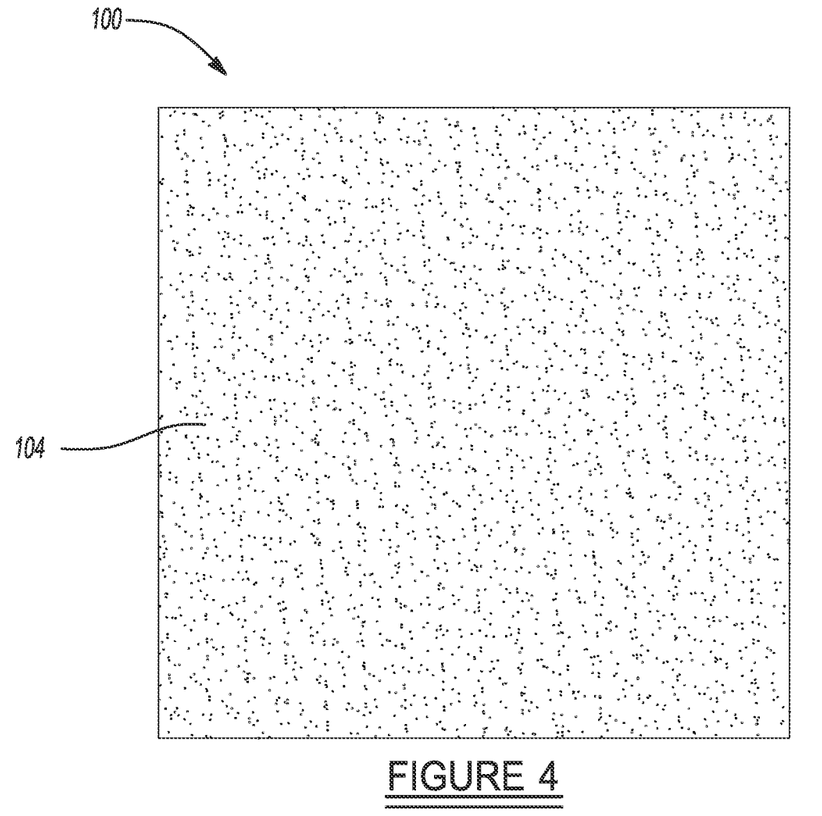
FIG. 4 shows a plan view of the substrate of FIG. 3.

Referring to FIGS. 3-10, various manufacturing operations will be described that may be used to form the gyroscope 10. In FIG. 3, the manufacturing process may begin with a silicon-on-insulator substrate material 100 having an electrical insulator layer 102 (e.g., silicon dioxide) coated on both sides with a quartz, borosilicate glass or other insulator layers 104a and 104b. FIG. 4 illustrates a plan view of the substrate material 100.

Figure 5:
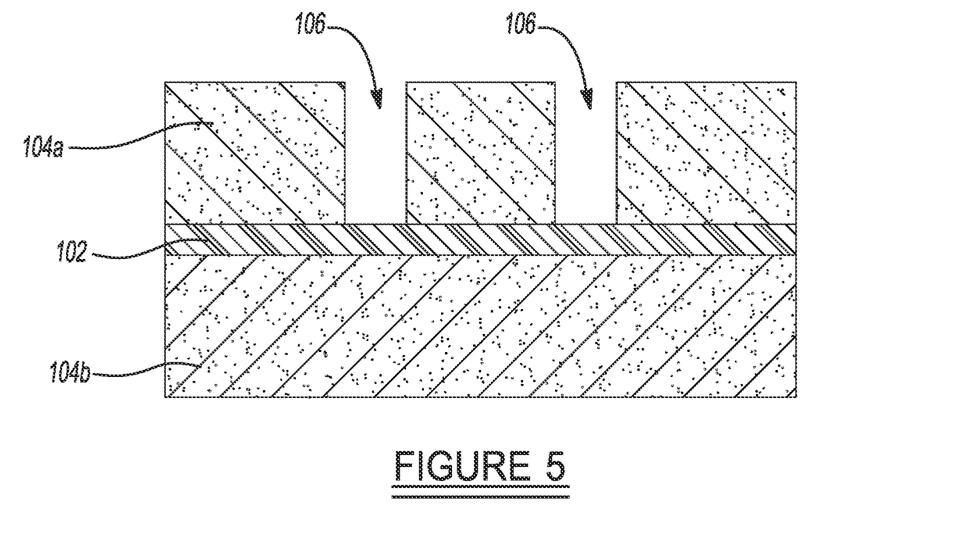
FIG. 5 shows a subsequent manufacturing operation in which portions of one of the quartz layers are removed to form the interspersed finger areas that will eventually become the fingers of the shuttles and stator portions of the gyroscope.
Figure 6:
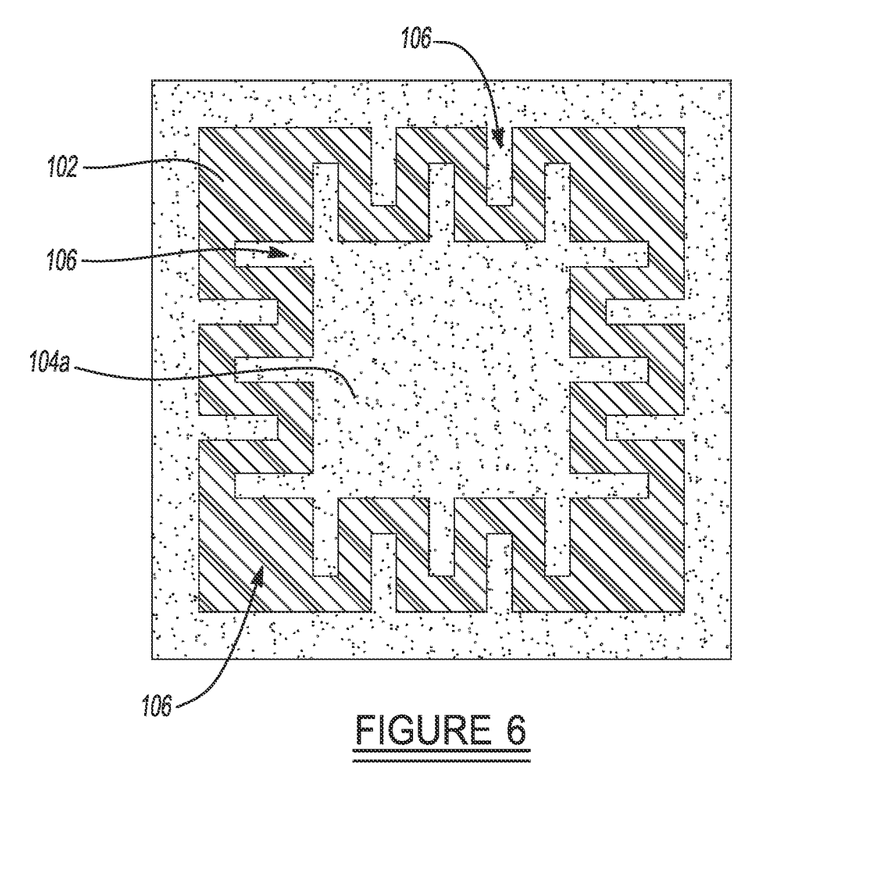
FIG. 6 shows a plan view of the structure of FIG. 5.

In FIG. 5 an inertial sensor pattern is formed, for example by etching away sections of material, indicated by areas 106 (or possibly by photolithic definition, or by shadow mask deposition, or by 3D printing, by directed deposition, etc.), from one of the layers 102. FIG. 6 shows a plan view of the substrate materials 100 after the etching is completed, which even better illustrates the various areas 106 of layer 104a that have been removed to form a sensor pattern.

Figure 7:
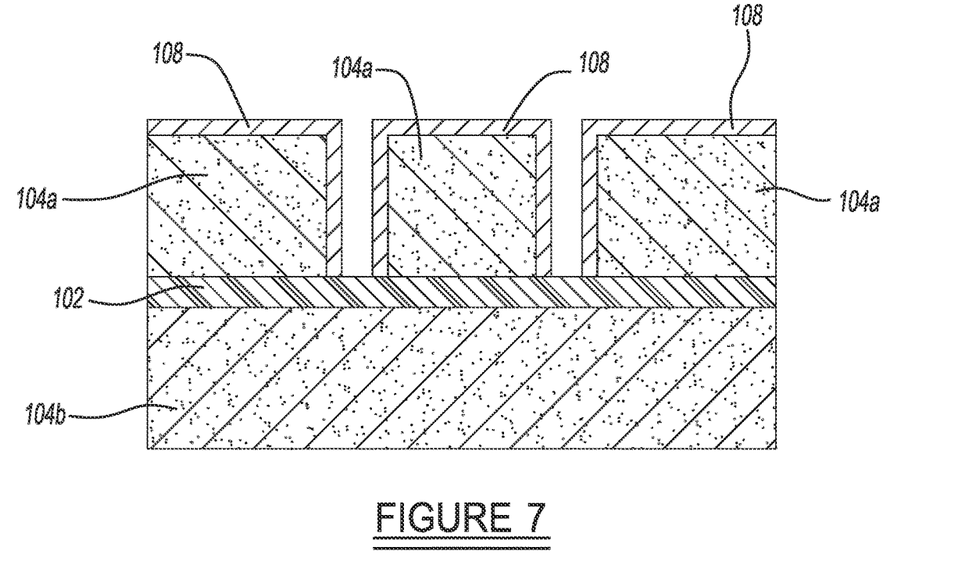
FIG. 7 shows portions of one layer of the substrate coated with a metal that will become a metal electrode layer.
Figure 8:
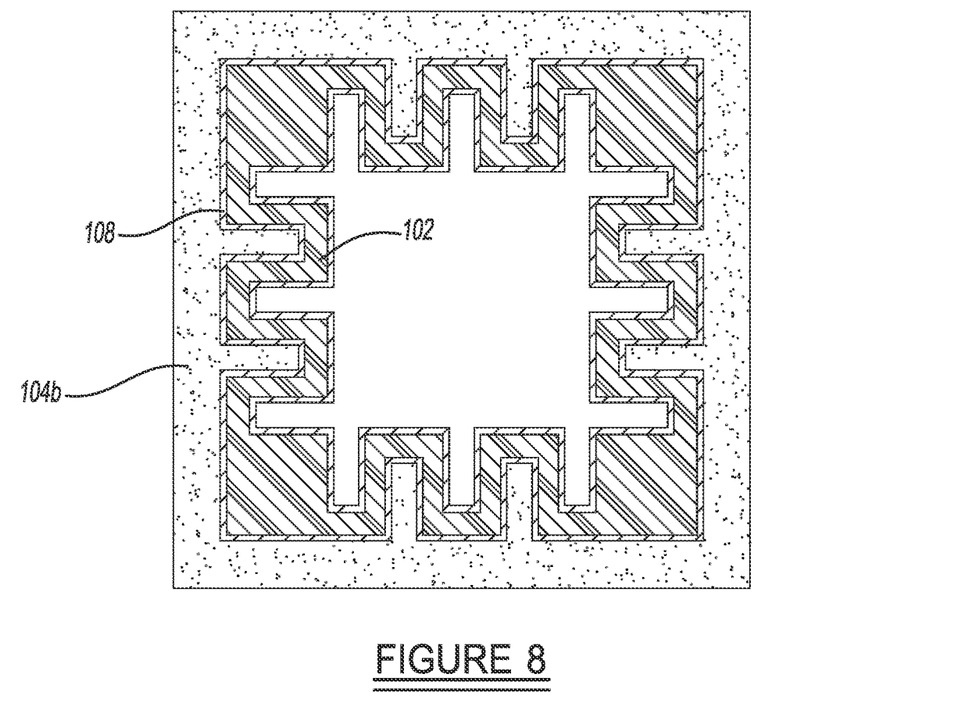
FIG. 8 shows a plan view of the structure of FIG. 7.

FIG. 7 illustrates that the areas that will form the fingers of the shuttle and stator portions (such as with portions 12 and 14 of the gyroscope 10 in FIGS. 1 and 2) are covered with a metal coating or layer 108 or other electrical conductive material. The metal coating or layer 108 may be formed by a conventional sputtering process, a conventional evaporative process or a conventional electrodeposition process. The metal coating 108 is also shown in plan view in FIG. 8.

Figure 9:
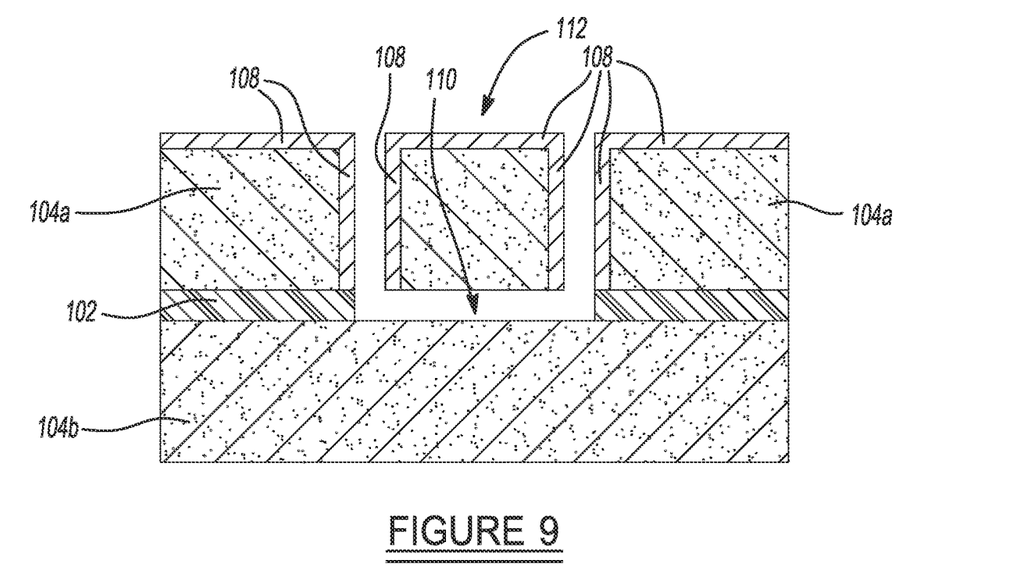
FIG. 9 shows how a portion of the substrate is removed to create a fully separate shuttle and stator components.
Figure 10:
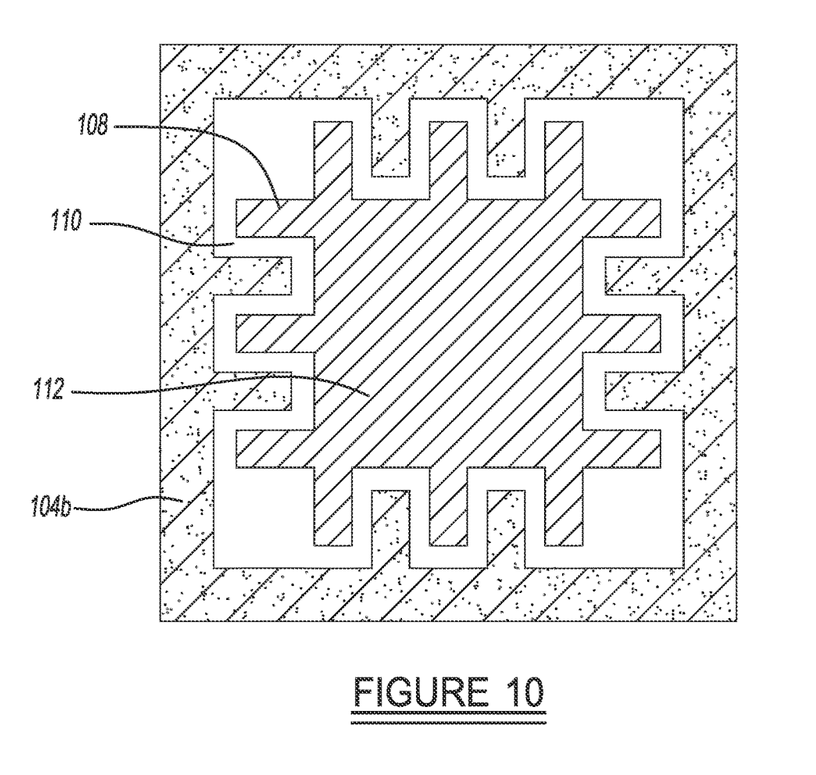
FIG. 10 shows a plan view of the pattern created from the machining operation of FIG. 9.

FIG. 9 illustrates that a portion of the layer 102 is removed, as indicated by arrow 110, to form the movable portion 112 (e.g., shuttle 12) of the gyroscope. The structure is shown in plan view in FIG. 10.

Figure 2A:
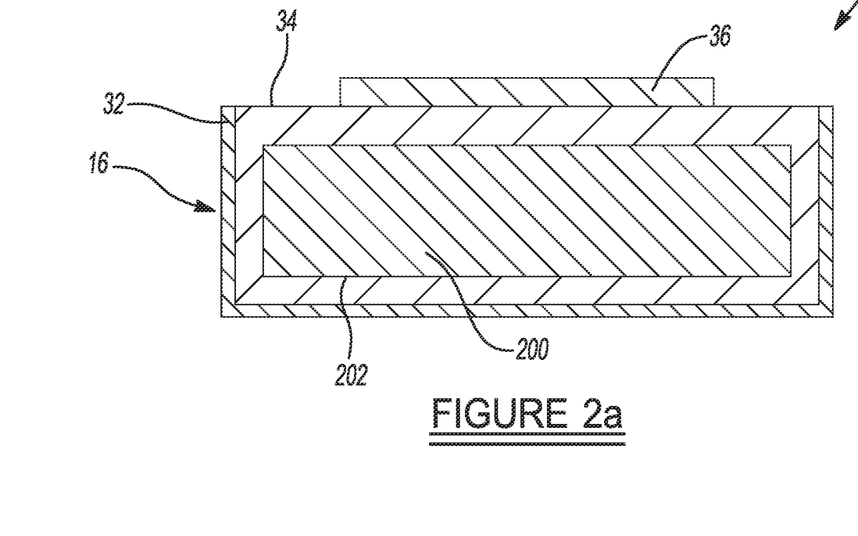
FIG. 2a shows a high level cross sectional end view of one of the flexors of FIG. 1.

Referring further to FIG. 2a, in one embodiment of the present disclosure, the shuttles 12 may also be constructed in a manner to enhance the mass of the shuttles. As noted earlier, quartz is a favored material for a resonator for its high quality factor ("Q") and its stability with respect to temperature variations. These qualities are important for the sensing capability of the gyroscope 10. To enhance the sensing capability even further, higher Coriolis forces can be generated by integrating a larger mass into each of the shuttles 12 of the gyroscope 10. This is illustrated in FIG. 2a in simplified fashion by a heavy metal 200 which is integrated into a void 202 in the shuttle 12. The heavy metal may be, for example, Aluminum, Gold, Platinum, Titanium, Copper, Palladium, Ruthenium, etc., deposited by filling a pre-formed void in the shuttle 12 with the selected heavy metal. Suitable techniques for filling the void may involve electroplating, chemical vapor deposition (CVD), etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A gyroscope, comprising:
   a shuttle having a body portion and a first plurality of fingers extending from the body portion, and a plurality of flexors;
   a stator having a second plurality of fingers and an insulative substrate;
   first and second spaced apart, fixed, support structures;
   the plurality of flexors supporting the shuttle for vibratory motion relative to the stator, and such that the fingers of the shuttle are able to move in a vibrating motion adjacent the fingers of the stator without contacting the fingers of the stator; and
   wherein portions of the fingers of at least one of the shuttle body portion and the stator are fabricated out of an insulator material layer to reduce parasitic capacitive coupling between the fingers of the shuttle and the fingers of the stator, as well as capacitive coupling with the substrate and the shuttle body portion.

2. The gyroscope of claim 1, wherein the body portion of the shuttle includes a quartz material layer on a portion thereof providing a piezoelectric effect.

3. The gyroscope of claim 2, wherein the quartz material layer is disposed on the flexors.

4. The gyroscope of claim 1, wherein the fingers of both the shuttle and the stator each have a grounded metal material layer.

5. The gyroscope of claim 1, wherein the gyroscope includes a plurality of stators arranged on opposing sides of the shuttle, and wherein each said stator includes a plurality of fingers each being at least partially covered with a grounded metal material layer.

6. The gyroscope of claim 5, further comprising an additional shuttle disposed between two of the plurality of stators, with the additional shuttle having, and being supported from the first and second support structures, by an additional plurality of flexors, and each one of the additional plurality of flexors including a quartz material layer thereon providing a piezoelectric effect.

7. The gyroscope of claim 1, wherein the shuttle includes a mass secured thereto.

8. The gyroscope of claim 7, wherein the mass is deposited in a void of the shuttle.

9. The gyroscope claim 1, wherein the shuttle includes a substrate made from an electrically insulative material.

10. A gyroscope, comprising:
    a plurality of shuttles each having a first plurality of fingers;
    a plurality of stators, each having a second plurality of fingers;
    a plurality of flexors operably associated with the plurality of shuttles;
    first and second spaced apart, fixed, support structures;
    the plurality of flexors supporting each one of the shuttles for vibratory motion relative to the stators, and such that the fingers of each one of the shuttles are able to move in vibratory motion adjacent the fingers of a corresponding pair of the stators; and
    wherein portions of the first plurality of fingers of each of the shuttles and the portions of each one of the second plurality of fingers of the stators include a grounded metal material layer to reduce parasitic capacitive coupling between the first plurality of fingers of the shuttle and the second plurality of fingers of the stator.

11. The gyroscope of claim 10, wherein each of the flexors includes a piezoelectric material layer.

12. The gyroscope of claim 11, wherein the piezoelectric material layer comprises a layer of quartz.

13. The gyroscope of claim 10, wherein at least one of the shuttles includes a mass supported thereon for increasing an overall mass of the at least one shuttle.

14. The gyroscope of claim 13, wherein the mass comprises a heavy metal including at least one of Aluminum, Platinum, Palladium, Titanium, Copper, Gold or Ruthenium.

15. The gyroscope of claim 14, wherein the mass is disposed in a void in the at least one of the shuttles.

16. The gyroscope of claim 13, wherein each of the shuttles includes a mass supported thereon.

17. A method for forming a gyroscope, comprising:

forming a substrate having an insulating layer with a first insulating material, covered on opposing surfaces thereof by layers of a second insulating material;

etching a sensor pattern in one of the opposing layers of the second insulating material to form a plurality of fingers;

coating portions of the fingers with a metal material;

grounding the metal material;

removing portions of the second insulating material to form a shuttle having a plurality of flexors, a fully separate stator, and a support substrate, the shuttle and the stator each including a plurality of fingers, the flexors of the shuttle enabling vibratory motion of the shuttle relative to the stator; and forming a piezoelectric material layer on at least portions the flexors for sensing a Coriolis force acting on the shuttle during motion of the shuttle.

18. The method of claim 17, wherein forming a piezoelectric material layer comprises forming a quartz material layer.

* * * * *